UNITED STATES PATENT OFFICE.

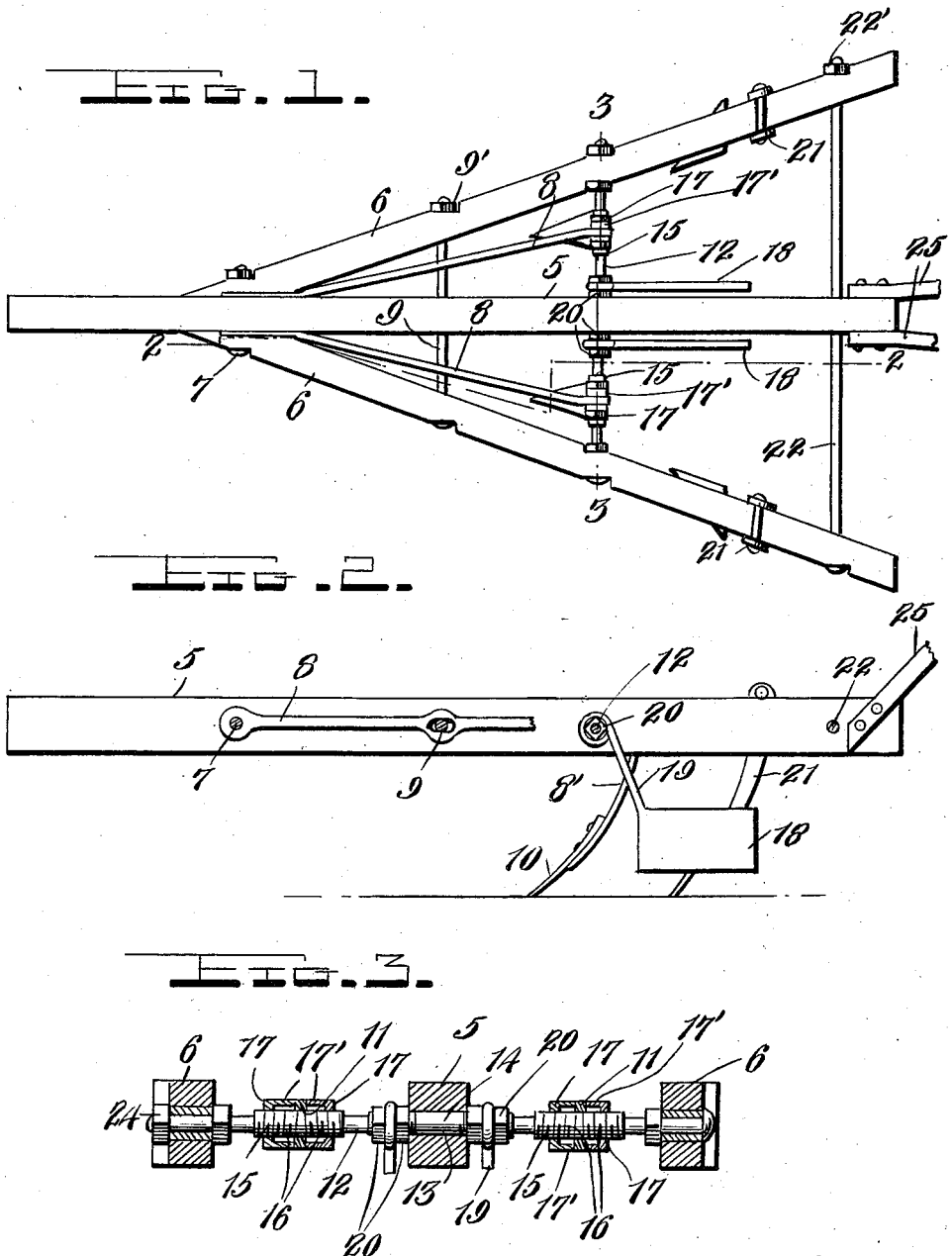

WILLIAM J. BURROWS, OF DE LAY, MISSISSIPPI, ASSIGNOR OF ONE-HALF TO WALTER G. DAVIS, OF DE LAY, MISSISSIPPI.

CULTIVATOR.

1,013,476.  Specification of Letters Patent.  Patented Jan. 2, 1912.

Application filed May 20, 1911. Serial No. 628,426.

*To all whom it may concern:*

Be it known that I, WILLIAM J. BURROWS, a citizen of the United States, residing at De Lay, in the county of Lafayette and State of Mississippi, have invented certain new and useful Improvements in Cultivators, of which the following is a specification, reference being had to the accompanying drawings.

This invention relates to improvements in cultivators and has for its object to provide a cultivator of that type wherein the soil at opposite sides of a plant row and the soil upon one side of adjacent plant rows is simultaneously plowed or disturbed.

A further object of the invention is to provide means for transversely adjusting the plow beams in accordance with the width of the plant row.

Still another object of my invention is to provide adjustable shield plates for preventing the earth being thrown by the plows or shovels upon the plants.

With the above and other objects in view, the invention consists of the novel features of construction, combination and arrangement of parts hereinafter fully described and claimed, and illustrated in the accompanying drawings, in which—

Figure 1 is a top plan view of a cultivator embodying my improvements; Fig. 2 is a section taken on the line 2—2 of Fig. 1; and Fig. 3 is an enlarged transverse section taken on the line 3—3 of Fig. 1.

Referring in detail to the drawing 5 designates the central longitudinal beam of a substantially V-shaped frame, the side beams 6 being rigidly secured to said beam at their forward ends and diverging rearwardly therefrom. The bolt 7 which secures the beams 5 and 6 together also passes through the forward ends of the plow or shovel beams 8. These shovel beams are formed of tempered steel, and adjacent to their secured ends they are reduced in thickness so as to render the same somewhat resilient. The beams 8 extend longitudinally between the central frame beam 5 and the side beam 6 and intermediate of their ends the beams 8 are provided with suitable openings to receive a transverse rod 9 which is also disposed through alined openings in the frame beams. One end of said rod is headed while a nut 10 is threaded upon the other end thereof.

The rear ends of the shovel beams 8 are curved downwardly as indicated at 8′ and have arranged upon their lower ends suitable shovels or plows 10 of any preferred form. These curved portions of the shovel beams are also provided with openings 11 through which the transverse rod 12 is loosely disposed, said rod also extending through the openings 13 in the frame beams 5 and 6. The rod 12 has centrally formed thereon a cylindrical enlargement 14 which is disposed through the central frame beam 5 and is provided with screw threads upon each of its ends. The rod 12 is also provided with additional cylindrical enlargements 15 adjacent to each end thereof, the opposite ends of the same being provided with right and left hand screw threads respectively, as indicated at 16. The openings in the curved rear ends 8′ of the shovel beams 8 are sufficiently large to loosely receive the enlargements 15 and upon the threaded ends thereof the nuts 17 are engaged and are adapted to be adjusted into contact with the opposite faces of the beam 8. It will therefore be seen that owing to the resilient nature of the beams 8, by simply adjusting the nuts 17 upon the threaded ends of the enlargements 15, the plows or shovels 10 may be transversely adjusted with relation to the frame whereby they can be properly positioned upon opposite sides of the plant row. The nuts 17 are formed with the short sleeves 17′ which are not provided with threads so that they can move freely upon the enlargements 16 as the nuts are adjusted.

Shield plates 18 are arranged on opposite sides of the beams 5, and each of said plates has formed on one end thereof a shank 19 which is provided with an opening to loosely receive the central cylindrical enlargement 14 of the rod 12. These shield plates extend longitudinally upon opposite sides of the plant row and closely adjacent to the plants. Nuts 20 are threaded upon the ends of the enlargements 14 whereby the shield plates may be transversely adjusted to dispose the same with relation to the plows or shovels 10 and in accordance with the width of the plant row. These shield plates effectually prevent the earth being thrown by the shovels upon the small plants which have not yet attained their full growth and would thus be killed.

To the rear ends of the diverging frame beams 6, the shovels 21 are rigidly secured. These shovels are adapted to be disposed upon one side of adjacent plant rows and are of such form that the earth or soil is thrown outwardly or away from the plants. The rear ends of the frame bars are connected by means of the transverse rod 22. A nut 23 is threaded on the end of said rod to retain the same in said beams and rigidly connect and brace said beams.

The openings in the frame beams which receive the rod 12 are of course of sufficient diameter to allow the enlargements of said rod to be readily passed therethrough. After positioning the rod, suitable sleeves or bushings 23 are adapted to be inserted into the openings in the side beams 6, and nuts 24 are then threaded on the end of the rod 12 to secure the same in the beams. To the rear end of the central frame beam 5 suitable handle bars 25 are fixed so that the cultivator may be readily guided or directed by the operator.

From the foregoing it is believed that the construction and operation of the invention will be fully understood without requiring any further description.

The cultivator is of comparatively simple construction, and as the forward plows or shovels and the shield plates may be easily and quickly adjusted, the machine can be adapted for use under varying conditions. Owing to the simplicity of construction of the various parts, the cultivator is also very strong and durable in practical use and may be easily and quickly assembled or disassembled for the purpose of repair.

While I have shown and described the various preferred forms of the parts, it will be understood that the elements of construction may be greatly modified within the scope of the claim without departing from the essential feature or sacrificing any of the advantages of the invention.

Having thus described the invention what is claimed is:—

In a cultivator, the combination with a frame, of longitudinally disposed plow beams reduced in thickness at one of their ends and fixed to said frame, said plow beams being resiliently movable transversely of the frame and having plows arranged upon their rear ends, a transverse rod mounted in the frame and having spaced cylindrical enlargements, the rear ends of said plow beams being loosely disposed on said enlargements, said enlargements of the rod being reversely screw threaded upon opposite sides of the beams, and nuts adjustable upon said threaded enlargements of the rod to bear against the opposite faces of the plow beams and move the same transversely with relation to each other and to securely clamp said beams in their adjusted positions.

In testimony whereof I hereunto affix my signature in the presence of two witnesses.

WILLIAM J. BURROWS.

Witnesses:
  WALTER G. DAVIS,
  JAMES P. BROWN.

Copies of this patent may be obtained for five cents each, by addressing the "Commissioner of Patents, Washington, D. C."